United States Patent [19]

Winger

[11] Patent Number: 5,179,374
[45] Date of Patent: Jan. 12, 1993

[54] COMMUNICATION NETWORK PRIORITIZATION SYSTEM FOR MOBILE UNIT

[75] Inventor: Darin G. Winger, Keller, Tex.

[73] Assignee: Motorola, Inc., Schaumburg, Ill.

[21] Appl. No.: 644,867

[22] Filed: Jan. 23, 1991

Related U.S. Application Data

[63] Continuation of Ser. No. 414,798, Sep. 29, 1989, abandoned.

[51] Int. Cl.⁵ ............................................. H04B 7/00
[52] U.S. Cl. .............................. 340/825.06; 455/33.1
[58] Field of Search ....................... 340/825.44, 825.49, 340/825.06; 455/33, 34, 33.1, 33.2, 34.1; 379/57, 59, 60, 63

[56] References Cited

U.S. PATENT DOCUMENTS

| | | | |
|---|---|---|---|
| 4,672,657 | 6/1987 | Dershowitz | 455/34 |
| 4,700,374 | 10/1987 | Bini | 379/60 |
| 4,713,808 | 12/1987 | Gaskill et al. | 370/94.1 |
| 4,833,701 | 5/1989 | Comroe et al. | 455/33 |
| 4,876,738 | 10/1989 | Selby | 379/59 |
| 5,067,147 | 11/1991 | Lee | 455/33 |

FOREIGN PATENT DOCUMENTS 0179232 7/1989 Japan .................... 455/34

Primary Examiner—Donald J. Yusko
Assistant Examiner—Dervis Magistre
Attorney, Agent, or Firm—Darleen J. Stockley

[57] ABSTRACT

A trunked communication system utilizes information on mobile unit location provided by a mobile unit to provide prioritized communication system availability. By further utilizing location information, the trunked communication system also provides a current communication system as a highest priority communication system as a mobile unit moves into a non-receiving area within an area served by the current communication system.

6 Claims, 3 Drawing Sheets

COMMUNICATION NETWORK PRIORITIZATION SYSTEM FOR MOBILE UNIT

This is a continuation of application Ser. No. 07/414,798 filed Sep. 29, 1989 and now abandoned.

TECHNICAL FIELD

This invention relates generally to mobile radio systems with location sensors that assist a user when changing geographical positions. This invention relates more particularly to a method of providing prioritized communication system availability information to a mobile unit user.

BACKGROUND OF THE INVENTION

Information systems supporting mobile units in computing location are known. The mobile unit user determines its location utilizing a location determining mechanism containing data bases of geographical information, for example, roads, rivers, landmarks, and so forth. Then the mobile unit user sends this information to a control base. The present systems provide the mobile unit with a comprehensive listing of communication systems available.

As a mobile unit user moves from a geographical area supported by one communication system to another geographical area supported by another communication system, it becomes desirable to provide the mobile unit user with the capability of determining the identity of the most readily available communication system without undue time expenditure.

Accordingly, there exists a need for a mobile unit user interface that minimizes the time required to select a valid adjacent communication system when the mobile unit user moves from a geographical area supported by one communication system to a geographical area supported by another communication system.

SUMMARY OF THE INVENTION

This need and others are substantially met by the communication network prioritization system based on location information as set forth in the present invention. This system includes generally an input mechanism for accepting location information regarding the within a particular location, an output mechanism for selectively providing user with a prioritized list of closest valid adjacent communication systems available to user, and an output mechanism for providing a highest priority communication system available to a user about to enter a non-receiving area.

BEST MODE FOR CARRYING OUT THE INVENTION

Figure 1:
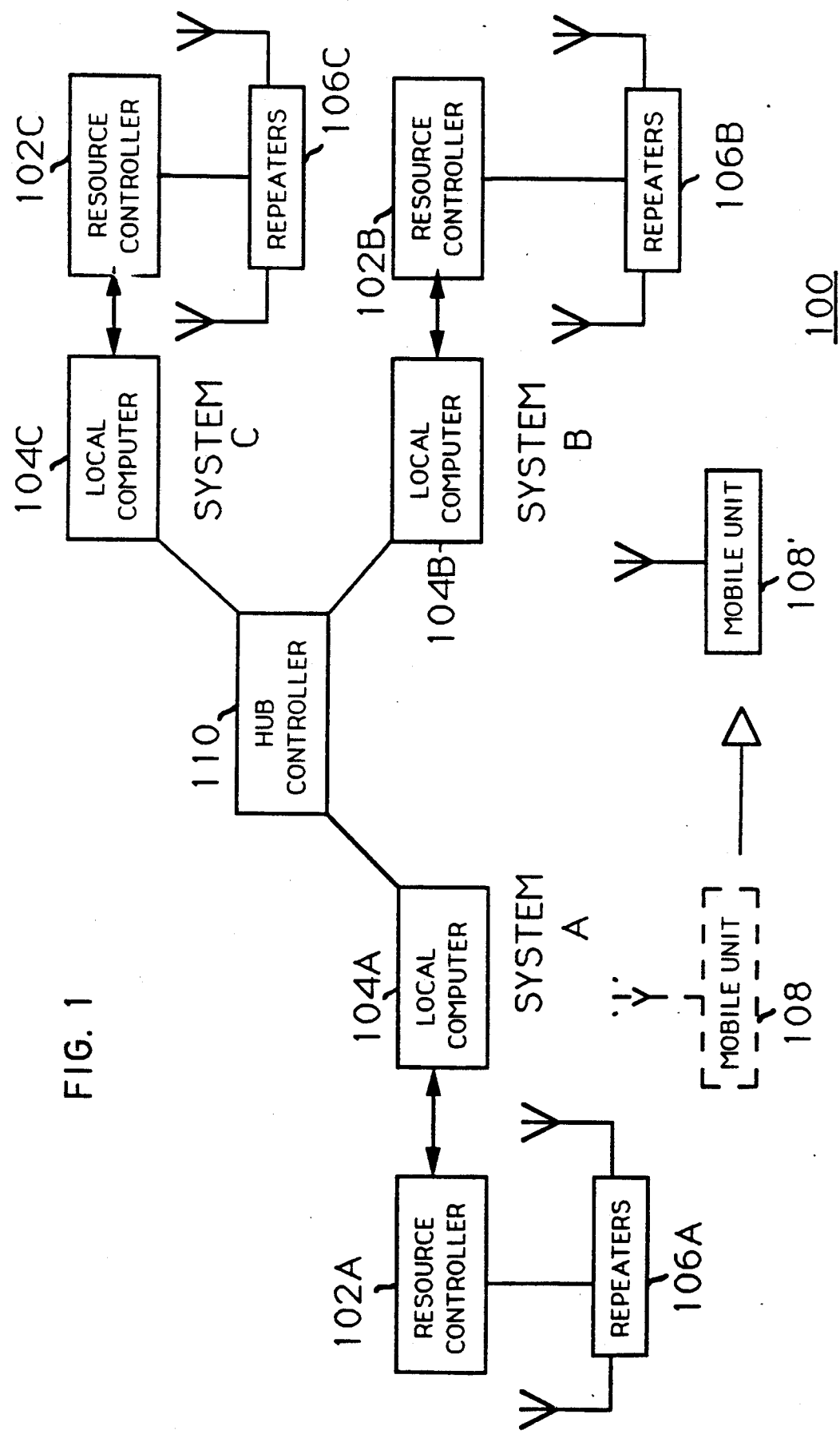
FIG. 1 is a block diagram of a networked trunked communication which operates in accordance with the present invention.

A plurality of trunked communication systems (depicted as A, B, and C, but not limited to that number) providing prioritized communication system availability information to mobile units (depicted as 108, later 108', but where a substantially larger number may be present) in accordance with the invention are set forth in FIG. 1, as depicted generally by the numeral 100.

In one embodiment, in a networked trunked system (100), a hub controller (110) and a plurality of resource controllers (shown as 102A, 102B, 102C, but not limited to that number) direct a plurality of systems (shown as A, B, and C, but not limited to that number) that incorporate the use of local computers to coordinate, assign and catalog the provision of prioritized communication system availability information to a plurality of mobile unit users (depicted as 108, later 108', but where a substantially larger number of users may be present). The hub controller (110) serves as a central data storage and retrieval unit.

As a mobile unit (108) moves about, the unit utilizes a location determining system known in the art, for example, Loran C, to establish at least an approximate location determination within a particular location. The mobile unit (108) transmits the approximate location determination to a local resource controller (102A). The resource controller (102A) utilizes a local computer (104A) that determines whether the mobile unit (108) is about to enter a non-receiving area or a peripheral receiving area and transmits a prioritized inventory of at least one valid adjacent communication system available adjacent to the particular location of the mobile unit (108), the mobile unit having a memory means for storing an inventory of at least a first available communication system, as a function, at least in part, of the location of the mobile unit.

Figure 2:
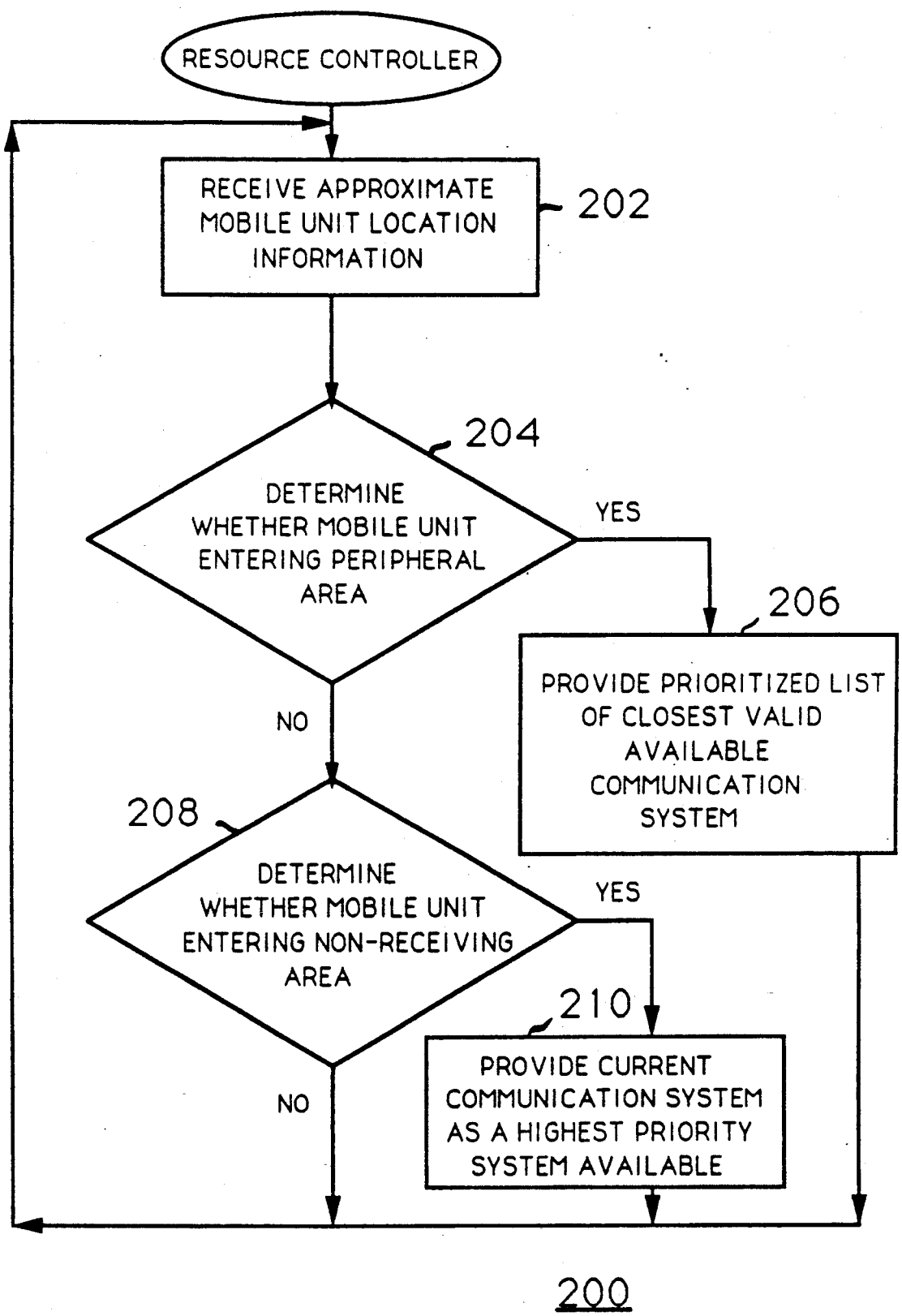
FIG. 2 is a flow diagram illustrating the steps executed by a resource controller of FIG. 1.

FIG. 2 illustrates the steps executed by a resource controller (102A), as generally depicted by the numeral 200. When the resource controller (102A) receives approximate mobile unit location information (202) from a mobile unit (108), it utilizes a local computer (104A) that determines whether the mobile unit (108) is entering a peripheral receiving area (204). If the resource controller determines that the mobile unit (108) is entering a peripheral receiving area, the resource controller (102A) utilizes a local computer (104A) to develop a prioritized list of closest valid available communication systems (206), adjacent to the particular location containing at least one such system, for the mobile unit in conformity with the approximate mobile unit location information. The resource controller (102A) transmits the prioritized list of closest valid available communication systems (206) to the mobile unit (108') and returns to the determination of receiving approximate mobile unit location information (202). If the resource controller (102A) utilizes, at least in part, the location of the mobile unit, to determine that the mobile unit is not entering a peripheral receiving area, the resource controller (102A) utilizes, at least in part, the location of the mobile unit to determine whether the mobile unit is entering a non-receiving area (208) adjacent to the particular location. If so, the resource controller (102A) utilizes a local computer (104A) to provide the mobile unit (108) with the current communication system as a highest priority system available (210). If the resource controller (102A) utilizes, at least in part, the location of the mobile unit, to determine that the mobile unit (108) is not entering a non-receiving area, the resource controller (102A) returns to the determination of receiving approximate mobile unit location information (202).

Figure 3:
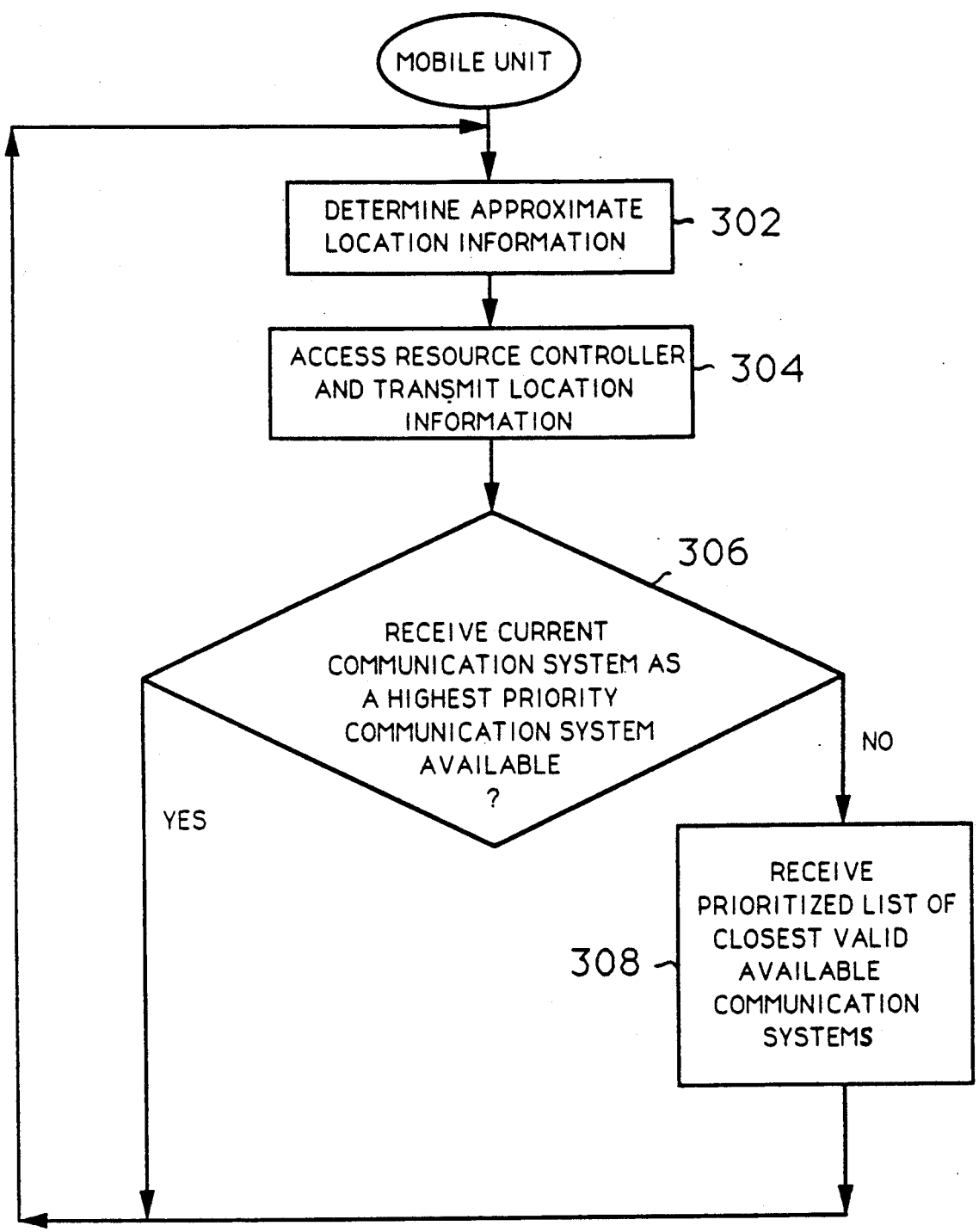
FIG. 3 is a flow diagram illustrating the steps executed by a mobile unit of FIG. 1.

FIG. 3 illustrates the steps executed by a mobile unit (108), as generally depicted by the numeral 300. The mobile unit (108) determines an approximate location information (302), utilizing at least one location determining device. The mobile unit (108) transmits the approximate location information (304) to a local resource controller (102A). If the mobile unit (108) receives a current communication system (A) as a highest priority communication system available (306), the mobile unit (108) returns to the determination of approximate location information (302). If the mobile unit (108) does not receive the current communication system (A) as a highest priority communication system available, the mobile unit (108, now 108'), receives a prioritized list of closest valid available communication systems (308) containing at least one valid available communication system and returns to the question of determining the approximate location information (302).

What is claimed is:

1. A communication network prioritization system for use with a mobile unit having a memory means for storing an inventory of at least a first available communication system, comprising:
   A) location determining means for at least approximately determining location of the mobile unit within a particular location; and
   B) discriminating means responsive to the location determining means for providing a prioritized inventory of peripheral communication systems available closely proximate to the particular location;
   such that the discriminating means selectively provides at least one valid closely proximate available communication system as a function, at least in part, of the location of the mobile unit.

2. A communication network prioritization system for use with a mobile unit having a memory means for storing an inventory of at least a first available communication system, comprising:
   A) location determining means for at least approximately determining location of the mobile unit within a particular location; and
   B) discriminating means responsive to the location determining means for providing current communication system as a highest priority communication system available to mobile unit entering non-receiving area peripheral to the particular location;
   such that the discriminating means selectively provides current communication system as a function, at least in part, of the location of the mobile unit.

3. A communication network prioritization system for use with a mobile unit having a memory means for storing an inventory of at least a first available communication system, comprising:
   A) location determining means for at least approximately determining location of the mobile unit within a particular location; and
   B) discriminating means responsive to the location determining means for providing current communication system as a highest priority communication system available to mobile unit entering peripheral receiving area closely proximate to the particular location;
   such that the discriminating means selectively provides current communication system as a function, at least in part, of the location of the mobile unit.

4. A method for prioritization of communication systems available to a mobile unit having a memory means for storing an inventory of at least a first available communication system, comprising the steps of:
   A) determining at least approximately a location information of a mobile unit within a particular location;
   B) communicating the location information to a resource controller; and
   C) sending a location prioritized list of valid available closely proximate communication systems closely proximate to the particular location to the mobile unit by the resource controller;
   wherein the prioritized list of valid available closely proximate communication systems is a function, at least in part, of the location of the mobile unit.

5. A method for prioritization of communication systems available to a mobile unit, comprising the steps of:
   A) determining at least approximately a location information of a mobile unit within a particular location;
   B) communicating the location information to a resource controller; and
   C) providing current communication system as a highest priority communication available to the mobile unit;
   wherein the mobile unit is entering a non-receiving area closely proximate to the particular location and the provision of the current communication system is a function, at least in part, of the location of the mobile unit.

6. A method for prioritization of communication systems available to a mobile unit having a memory means for storing an inventory of at least a first available communication system, comprising the steps of:
   A) determining at least approximately a location information of a mobile unit within a particular location;
   B) communicating the location information to a resource controller; and
   C) providing current communication system as a highest priority communication available to the mobile unit;
   wherein the mobile unit is entering a peripheral receiving area closely proximate to the particular location and the provision of the current communication system is a function, at least in part, of the location of the mobile unit.

* * * * *